US010098135B2

(12) United States Patent
Huang et al.

(10) Patent No.: US 10,098,135 B2
(45) Date of Patent: Oct. 9, 2018

(54) ACTION FRAME FOR SCHEDULE UPDATE IN A NAN

(71) Applicant: Intel IP Corporation, Santa Clara, CA (US)

(72) Inventors: Po-Kai Huang, West Lafayette, IN (US); Elad Oren, Tel Aviv (IL); Emily H. Qi, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 9 days.

(21) Appl. No.: 15/194,257

(22) Filed: Jun. 27, 2016

(65) Prior Publication Data

US 2017/0245296 A1 Aug. 24, 2017

Related U.S. Application Data

(60) Provisional application No. 62/298,048, filed on Feb. 22, 2016.

(51) Int. Cl.
*H04W 72/12* (2009.01)
*H04W 84/12* (2009.01)

(52) U.S. Cl.
CPC .... *H04W 72/1205* (2013.01); *H04W 72/1284* (2013.01); *H04W 84/12* (2013.01)

(58) Field of Classification Search
None
See application file for complete search history.

(56) References Cited

U.S. PATENT DOCUMENTS

| 9,072,090 | B2 * | 6/2015 | Segev | H04W 72/044 |
| 9,723,581 | B2 * | 8/2017 | Patil | H04W 56/001 |
| 9,820,131 | B2 * | 11/2017 | Abraham | H04W 8/005 |
| 2004/0047351 | A1 * | 3/2004 | Del Prado Pavon | H04W 72/1278 370/395.4 |
| 2005/0213576 | A1 * | 9/2005 | Stephens | H04L 12/12 370/390 |
| 2006/0165046 | A1 * | 7/2006 | Del Prado Pavon | H04L 1/1829 370/350 |
| 2012/0092184 | A1 | 4/2012 | Carr et al. | |

(Continued)

OTHER PUBLICATIONS

"International Application Serial No. PCT/US2017/014515, International Search Report dated May 8, 2017", 3 pgs.

(Continued)

*Primary Examiner* — Ayaz R Sheikh
*Assistant Examiner* — Tarell A Hampton
(74) *Attorney, Agent, or Firm* — Schwegman, Lundberg & Woessner, P.A.

(57) ABSTRACT

Devices and methods of providing a NAN schedule update are generally described. NAN devices communicate data on a schedule of repeating time blocks in which transmission in different time blocks are on different channels. A public action frame indicates in a subfield that the frame is a schedule update frame. The schedule update frame provides attributes to have general schedule update for availability time, existing unicast service or existing multicast service. The schedule update frame also contains a schedule update control field that indicates in a subfield that the current time block is cancelled or extended or provides a general schedule update. The schedule update control field also indicates a reason for the schedule update.

24 Claims, 9 Drawing Sheets

(56) References Cited

U.S. PATENT DOCUMENTS

| | | | |
|---|---|---|---|
| 2012/0315853 A1 | 12/2012 | Lambert | |
| 2015/0006633 A1* | 1/2015 | Vandwalle | H04L 67/1051 709/204 |
| 2015/0109961 A1* | 4/2015 | Patil | H04W 4/206 370/254 |
| 2015/0109981 A1* | 4/2015 | Patil | H04L 67/1078 370/311 |
| 2015/0139217 A1 | 5/2015 | Qi et al. | |
| 2015/0156797 A1* | 6/2015 | Park | H04W 74/0808 370/329 |
| 2015/0319695 A1* | 11/2015 | Huang | H04W 4/008 370/311 |
| 2016/0014694 A1 | 1/2016 | Patil et al. | |
| 2016/0150465 A1* | 5/2016 | Jung | H04W 48/16 370/254 |
| 2016/0150466 A1* | 5/2016 | Jung | H04W 8/005 455/434 |
| 2016/0157089 A1* | 6/2016 | Qi | H04W 76/046 370/254 |
| 2016/0174221 A1* | 6/2016 | Patil | H04L 5/0055 370/329 |
| 2016/0198328 A1* | 7/2016 | Qi | H04W 8/005 370/330 |
| 2016/0249200 A1* | 8/2016 | Liu | H04W 8/005 |
| 2016/0278112 A1* | 9/2016 | Liu | H04W 8/005 |
| 2016/0353470 A1* | 12/2016 | Liu | H04L 65/4076 |
| 2016/0381431 A1* | 12/2016 | Patterson | H04N 21/6405 725/110 |

OTHER PUBLICATIONS

"International Application Serial No. PCT/US2017/014515, Written Opinion dated May 8, 2017", 4 pgs.

Zhou, Lan, et al., "Deployment Scenarios and Signalling Methods for Enablement", IEEE 802.11-10/1020r0, [Online]. Retrieved from the Internet: <https://mentor.ieee.org/802.11/dcn/10/11-10-1020-00-00af-deployment-scenari>os-and-rlqp-public-action-frame-usage.ppt, (Aug. 31, 2010).

* cited by examiner

| FIELD | SIZE (OCTETS) | VALUE (HEXADECIMAL) | DESCRIPTION |
|---|---|---|---|
| CATEGORY | 1 | 0x04 | IEEE 802.11 PUBLIC ACTION FRAME |
| ACTION FIELD | 1 | 0x09 | IEEE 802.11 PUBLIC ACTION FRAME VENDOR SPECIFIC |
| OUI | 3 | 0x50-6F-9A | Wi-Fi ALLIANCE SPECIFIC OUI |
| OUI TYPE | 1 | TBD | IDENTIFYING THE TYPE AND VERSION OF THE NAN2 |
| OUI SUBTYPE | 1 | VARIABLE | IDENTIFYING THE TYPE OF NAN2 ACTION FRAME. THE SPECIFIC VALUE IS DEFINED IN TABLE 5-X2. |
| SCHEDULE UPDATE CONTROL | 1 | VARIABLE | BIT 0 -1: INDICATE ACTION OF SCHEDULING UPDATE<br>0: CANCEL THE CURRENT TIME BLOCK (EARLY TERMINATION).<br>1 : EXTENSION OF THE CURRENT TIME BLOCK (THE DURATION OF THE EXTENSION IS INDICATED IN A FOLLOWING ATTRIBUTE)<br>2: GENERAL SCHEDULE UPDATE<br><br>BIT 2-X: SCHEDULING UPDATE REASON CODE<br>0: UNSPECIFIED<br>1: CHANNEL SWITCHING<br>2: POWER SAVE<br>3: NO TRAFFIC<br>4: CONGESTION<br>BIT X-7: RESERVED |
| MORE ATTRIBUTES | VARIABLE | VARIABLE | |

FIG. 6

| OUI SUBTYPE | NOTES |
|---|---|
| 0 | RESERVED |
| 1 | RANGING REPORT |
| 2 | GENERIC ADVERTISEMENT SERVICE (GAS) SCHEDULE REQUEST |
| 3 | GAS SCHEDULE RESPONSE |
| 4 | RANGING REQUEST |
| 5 | RANGING RESPONSE |
| 6 | NAN DATA REQUEST |
| 7 | NAN DATA RESPONSE |
| 8 | NAN DATA CONFIRM |
| 9 | NAN SCHEDULE UPDATE |
| 10-255 | RESERVED |

FIG. 7

| ATTRIBUTES | ATTRIBUTE ID | NOTES |
|---|---|---|
| SCHEDULE UPDATE CONTROL | | PRESENT IF SCHEDULE UPDATE CONTROL IS NOT INCLUDED AS PART OF ACTION FRAME |
| NDL QoS | | MAY BE PRESENT |
| MULTICAST SCHEDULE | | MAY BE PRESENT |
| NAN AVAILABILITY | | MAY BE PRESENT |
| UNALIGNED SCHEDULE | | MAY BE PRESENT |
| FURTHER AVAILABILITY MAP | | MAY BE PRESENT |

FIG. 8

| FIELD | SIZE (OCTETS) | VALUE | DESCRIPTION |
|---|---|---|---|
| ATTRIBUTE ID | 1 | 0x02 | IDENTIFIES THE TYPE OF NAN ATTRIBUTE |
| LENGTH | 2 | VARIABLE | LENGTH OF THE FOLLOWING FIELDS IN THE ATTRIBUTE |
| SCHEDULE UPDATE CONTROL | 1 | VARIABLE | BIT 0-1: INDICATE TYPE OF SCHEDULING UPDATE<br>0: INDICATE TO CANCEL THE CURRENT TIME BLOCK (EARLY TERMINATION).<br>1: INDICATE LENGTH THE CURRENT TIME BLOCK<br>2: INDICATE GENERAL SCHEDULE UPDATE<br><br>BIT 2-X: SCHEDULING UPDATE REASON CODE<br>0: UNSPECIFIED<br>1: CHANNEL SWITCHING<br>2: POWER SAVE<br>3: NO TRAFFIC<br>4: CONGESTION<br>BIT X-7: RESERVED |

FIG. 9

ACTION FRAME FOR SCHEDULE UPDATE IN A NAN

PRIORITY CLAIM

This application claims the benefit of priority to U.S. Provisional Patent Application Ser. No. 62/298,048, filed Feb. 22, 2016, and entitled "ACTION FRAME FOR SCHEDULE UPDATE," which is incorporated herein by reference in its entirety.

TECHNICAL FIELD

Embodiments pertain to wireless communications. Some embodiments relate to wireless local area networks (WLANs) and Wi-Fi networks including networks operating in accordance with the IEEE 802.11 family of standards, such as the IEEE 802.11ac standard, the IEEE 802.11ax study group (SG) (named DensiFi) or IEEE 802.11ay. Some embodiments relate to updating the scheduling between Wi-Fi alliance Wi-Fi Aware 2.0 Neighborhood Awareness Network (NAN) STAs.

BACKGROUND

The use of personal communication devices has increased astronomically over the last two decades. The penetration of mobile devices and other stations (STAs or user equipment) in modern society has continued to drive demand for a wide variety of networked devices in a number of disparate environments. The use of networked STAs using a variety of communication protocols and in a variety of networks has increased in all areas of home and work life. The IEEE 802.11 NAN2 specification in particular has defined periodic schedules for negotiation between two NAN2 devices. Although in certain situations it may be desirable to update the schedules, no mechanism currently exists.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 6 illustrates a schedule update frame in accordance with some embodiments.

FIG. 7 illustrates action frame subtypes in accordance with some embodiments.

FIG. 8 illustrates additional public action frame attributes in accordance with some embodiments.

FIG. 9 illustrates a schedule update control attribute in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
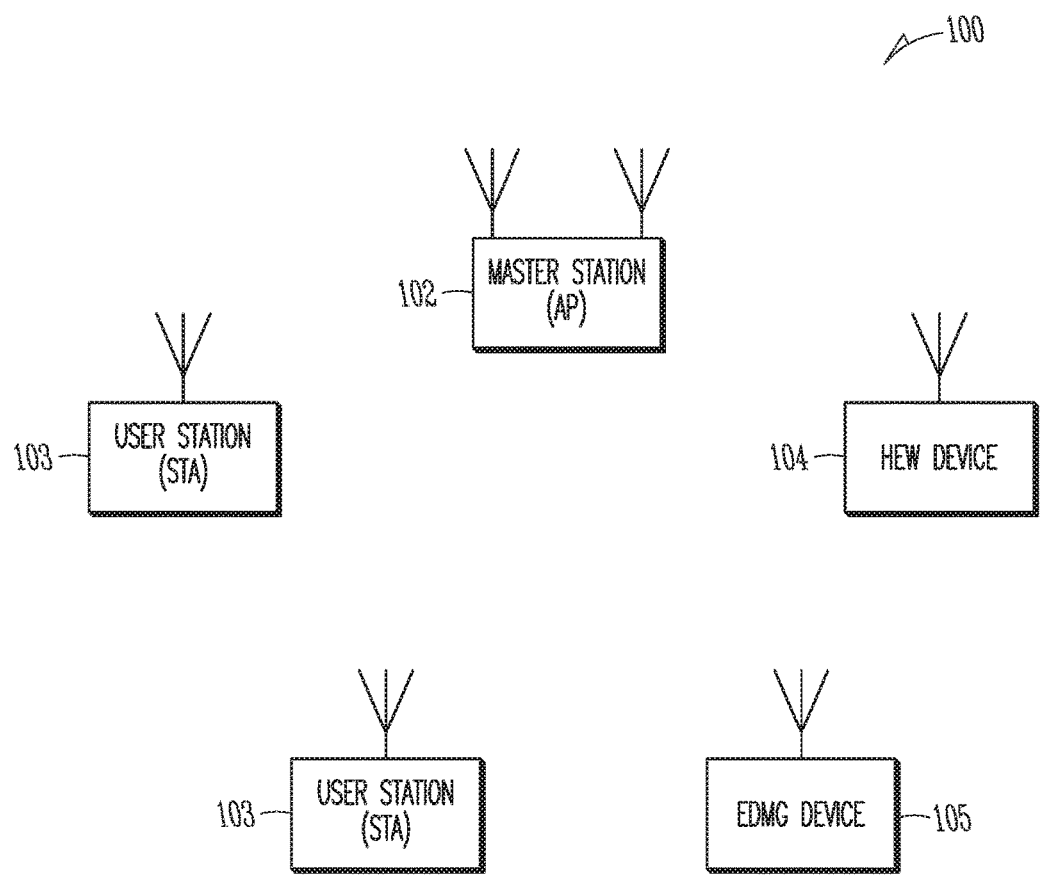
FIG. 1 is a wireless network in accordance with some embodiments.

FIG. 1 illustrates a wireless network in accordance with some embodiments. In the network 100 may be an Enhanced Directional Multi Gigabit (EDMG) network, a High Efficiency Wireless Local Area Network (HEW) network, and/or a Wireless Local Area Network (WLAN) or a Wi-Fi network. As an example, the network 100 may support EDMG devices in some cases, non EDMG devices in some cases, and a combination of EDMG devices and non EDMG devices in some cases. As another example, the network 100 may support HEW devices in some cases, non HEW devices in some cases, and a combination of HEW devices and non HEW devices in some cases. As another example, some devices supported by the network 100 may be configured to operate according to EDMG operation and/or HEW operation and/or legacy operation. Accordingly, it is understood that although techniques described herein may refer to a non EDMG device, an EDMG device, a non HEW device or an HEW device, such techniques may be applicable to any or all such devices in some cases.

The network 100 may include any number (including zero) of master stations (STA) 102, user stations (STAs) 103, HEW stations 104 (HEW devices), and EDMG stations 105 (EDMG devices). The master station 102 may be a stationary non-mobile device, such as an access point (AP) providing services of the NAN2 network. In some embodiments, the STAs 103 may be legacy stations. These embodiments are not limiting, however, as the STAs 103 may be HEW devices or may support HEW operation in some embodiments. In some embodiments, the STAs 103 may be EDMG devices or may support EDMG operation. It should be noted that embodiments are not limited to the number of master STAs 102, STAs 103, HEW stations 104 or EDMG stations 105 shown in the example network 100 in FIG. 1. The master station 102 may be arranged to communicate with the STAs 103 and/or the HEW stations 104 and/or the EDMG stations 105 in accordance with one or more of the IEEE 802.11 standards. In accordance with some HEW embodiments, an AP may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, a first STA 103 may transmit a grant frame to a second STA 103 to indicate a transmission of a data payload on primary channel resources or on secondary channel resources. The first STA 103 may receive an acknowledgement message for the grant frame from the second STA 103. The first STA 103 may transmit a data payload to the second STA 103 in the channel resources indicated in the grant frame. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement. The master station 102 may form a Basic Service Set (BSS) with the other STAs 103, 104, 105 having a BSSID and communicating using IEEE 802.11 protocols (using an IEEE 802.11a/b/g/n/ac or ax protocol) in a Wireless Local Area Network (WLAN) or Wi-Fi network.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In some embodiments, EDMG communication may be configurable to use channel resources that may include one or more frequency bands of 2.16 GHz, 4.32 GHz or other bandwidth. Such channel resources may or may not be contiguous in frequency. As a non-limiting example, EDMG communication may be performed in channel resources at or near a carrier frequency of 60 GHz.

In some embodiments, primary channel resources may include one or more such bandwidths, which may or may not be contiguous in frequency. As a non-limiting example, channel resources spanning a 2.16 GHz or 4.32 GHz bandwidth may be designated as the primary channel resources. As another non-limiting example, channel resources spanning a 20 MHz bandwidth may be designated as the primary channel resources. In some embodiments, secondary channel resources may also be used, which may or may not be contiguous in frequency. As a non-limiting example, the secondary channel resources may include one or more frequency bands of 2.16 GHz bandwidth, 4.32 GHz bandwidth or other bandwidth. As another non-limiting example, the secondary channel resources may include one or more frequency bands of 20 MHz bandwidth or other bandwidth.

In some embodiments, the primary channel resources may be used for transmission of control messages, beacon frames or other frames or signals by the AP 102. As such, the primary channel resources may be at least partly reserved for such transmissions. In some cases, the primary channel resources may also be used for transmission of data payloads and/or other signals. In some embodiments, the transmission of the beacon frames may be restricted such that the AP 102 does not transmit beacons on the secondary channel resources. Accordingly, beacon transmission may be reserved for the primary channel resources and may be restricted and/or prohibited in the secondary channel resources, in some cases.

Figure 2:
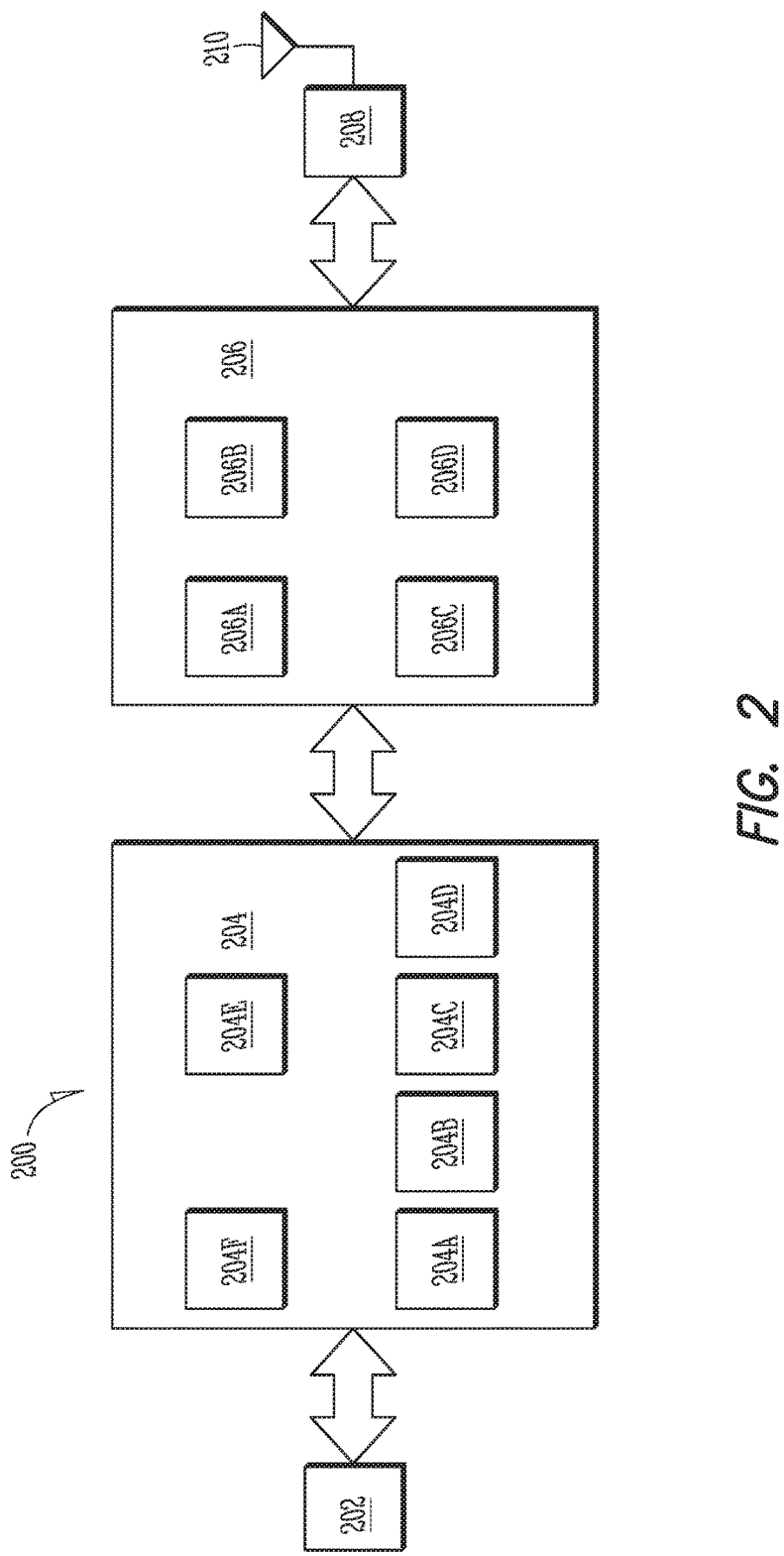
FIG. 2 illustrates components of a communication device in accordance with some embodiments.

Embodiments described herein may be implemented into a system using any suitably configured hardware and/or software. FIG. 2 illustrates components of a STA in accordance with some embodiments. At least some of the components shown may be used in an AP, for example, such as the STA 102 or AP 104 shown in FIG. 1. The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204*a*, third generation (3G) baseband processor 204*b*, fourth generation (4G) baseband processor 204*c*, and/or other baseband processor(s) 204*d* for other existing generations, generations in development or to be developed in the future (e.g., fifth generation (5G), 6G, etc.). The baseband circuitry 204 (e.g., one or more of baseband processors 204*a-d*) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the STA 200 can be configured to operate in accordance with communication standards or other protocols or standards, including Institute of Electrical and Electronic Engineers (IEEE) 802.16 wireless technology (WiMax), IEEE 802.11 wireless technology (Wi-Fi) including 802.11ax, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206*d* may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206*d* of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the STA 200 may include additional elements such as, for example, memory/storage, display, camera, sensor, and/or input/output (I/O) interface as described in more detail below. In some embodiments, the STA 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the STA 200 may include one or more user interfaces designed to enable user interaction with the system and/or peripheral component interfaces designed to enable peripheral component interaction with the system. For example, the STA 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antenna 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the STA 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
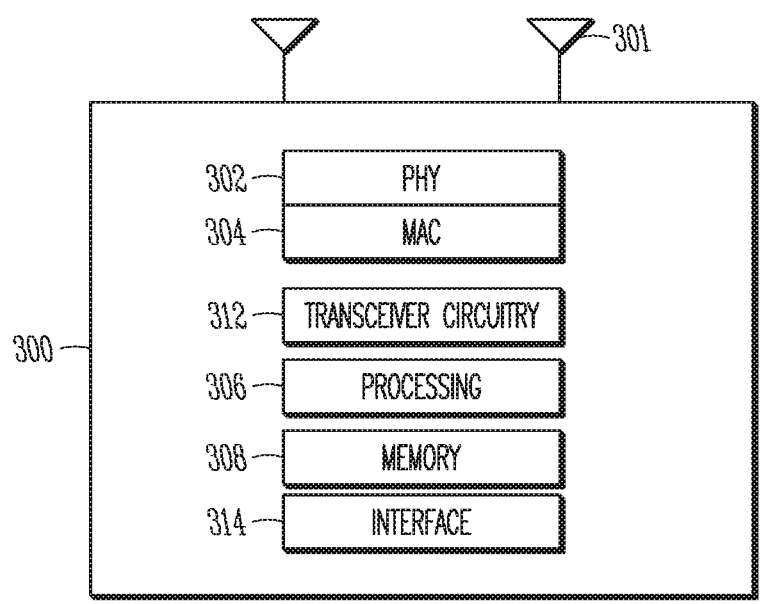
FIG. 3 illustrates a block diagram of a communication device in accordance with some embodiments.

FIG. 3 is a block diagram of a communication device in accordance with some embodiments. The device may be a STA or AP or NAN2 device, for example, such as the STA 102 or AP 104 shown in FIG. 1. The communication device 300 may include physical layer circuitry 302 and transceiver circuitry 312 for transmitting and receiving signals to and from one or more APs, STAs or other devices using one or more antennas 301. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The communication device 300 may also include wired and/or wireless interfaces 310 to communicate with components external to the network. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, Wi-Fi, GSM, EDGE, GERAN, UMTS, UTRAN, or other 3G, 3G, 4G, 5G, etc. technologies either already developed or to be developed. The physical layer circuitry 202, MAC layer circuitry 304, transceiver circuitry 312, processing circuitry 308, memory 308 and interfaces 310 may be separate components or may be part of a combined component.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

In some embodiments, the communication device 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly.

In some embodiments, the communication device 300 may communicate using OFDM communication signals over a multicarrier communication channel. Accordingly, in some cases the communication device 300 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the communication device 300 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In accordance with embodiments, the communication device 300 may transmit an SM-OFDM signal that comprises multiple OFDM signals, and the SM-OFDM signal may be received at the communication device 300. The SM-OFDM signal may be transmitted in channel resources that comprise multiple sub-carriers and the OFDM signals may be based at least partly on data symbols for used data portions of the sub-carriers. The used data portions may be based on a first portion of encoded bits and the data symbols for the used data portions may be based on a second portion of the encoded bits. In some examples, the used data portions of the sub-carriers may be different for at least some of the OFDM signals.

In some embodiments, the channel resources may be used for downlink transmission and for uplink transmissions by the communication device 300. That is, a time-division duplex (TDD) format may be used. In some cases, the channel resources may include multiple channels, such as the 20 MHz channels previously described. The channels may include multiple sub-channels or may be divided into multiple sub-channels for the uplink transmissions to accommodate multiple access for multiple communication devices 300. The downlink transmissions may or may not utilize the same format.

In some embodiments, the downlink sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 4:
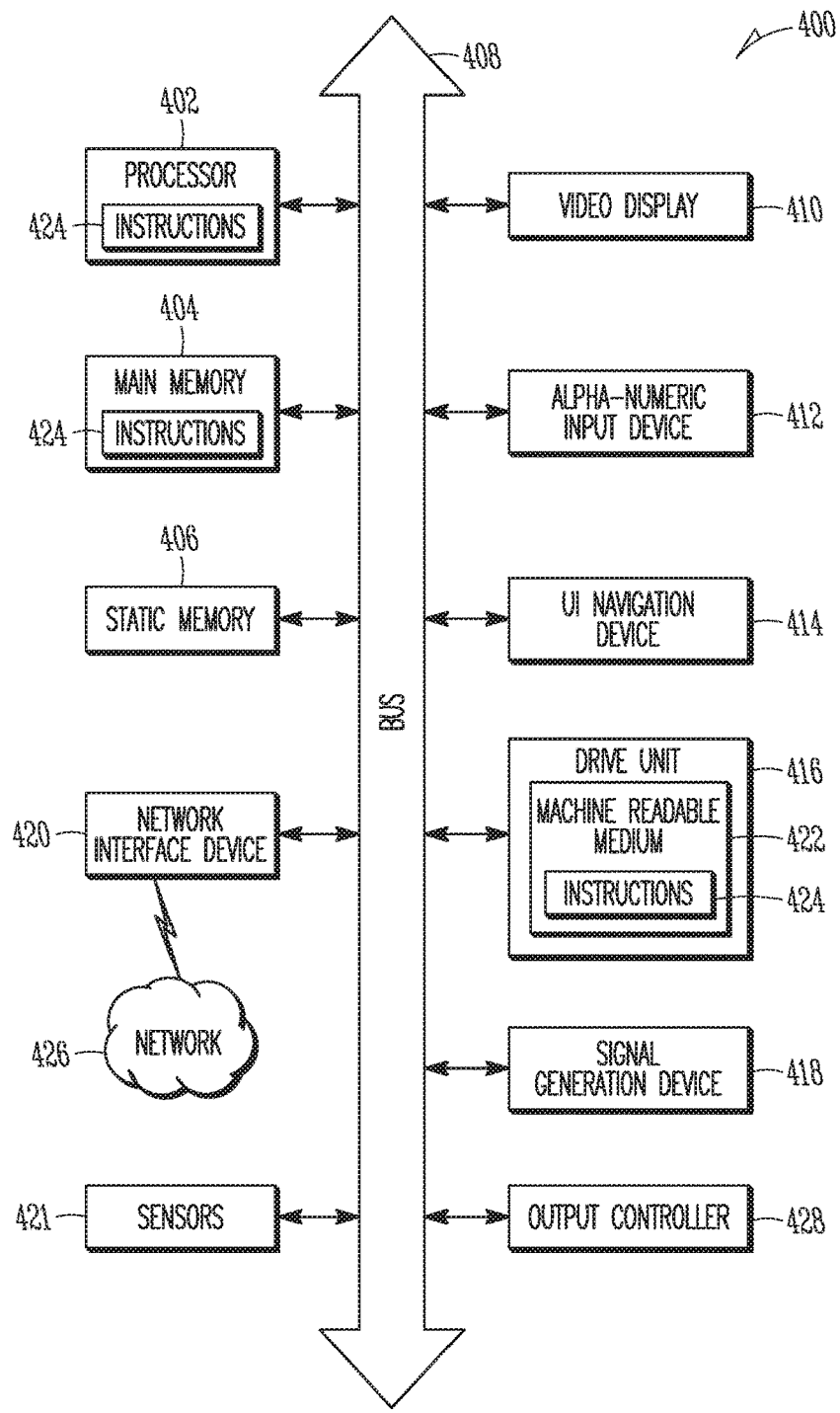
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be an AP or a STA or NAN2 device, such as a PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408.

The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

Wi-Fi Aware 2.0 initiatives from the Wi-Fi Aware IEEE group to provide multicast/unicast service support are ongoing. In Wi-Fi Aware 2.0, STAs may be publishers, subscribers, or both. Publishers may persistently broadcast a signal that indicates permission to connect. Subscribers persistently search for publishers, and when found, may initiate a connection request. NAN2 STAs may thus specifically advertise services provided and groups to other STAs are permitted join as well as discovering services offered by other, proximate STAs. To this end, STAs in a NAN2 network may provide frames for a variety of network functions. The frames may include action frames that, among others, permit network synchronization for STAs and subscription frames that permit advertisement and discovery of various multicast and unicast services, as well as beacon frames that advertise the presence of the NAN network. One or more STAs may set up a NAN Data Path (NDP) with one or more other STAs for service delivery, either directly or through an intermediary such as an AP, using a NAN Data Link (NDL) for a schedule for the services.

Figure 5:
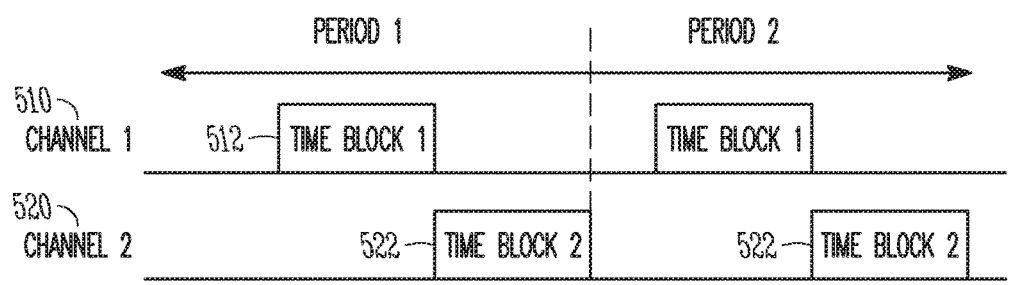
FIG. 5 illustrates station (STA) scheduling negotiation in accordance with some embodiments.

As above, NAN2 has defined schedules for negotiation between different NAN2 STAs. FIG. 5 illustrates STA scheduling negotiation in accordance with some embodiments. Each STA may be, for example, a NAN2 device. Each STA may communicate with each other using different channels 510, 520 at different times, e.g., frequency hopping to decrease interference. The STAs may thus communicate over different frequencies, which may be in different frequency bands, both of which may be known to the STAs. The scheduled communications on the different channels 510, 520 may be comprised of transmissions on time blocks 512, 522 (hereinafter referred to merely as time blocks for convenience) in which the publisher and subscriber switch in the different time blocks 512, 522. Each time block 512, 522 may not overlap and, in some embodiments, may be adjacent to another time block on a different channel, allowing sufficient time for the STAs to switch between the channels. The spacing between the time blocks 512, 522 may thus be dependent on the STA characteristics, such as the amount of time each STA takes to switch between the transmitter and receiver chain. As shown in FIG. 5, the schedule of the time blocks 512, 522 may repeated periodically, with the time blocks 512, 522 appearing in the same relative positions within each period. The schedule may be known to the STAs, having been provided through the NDL from the publisher to the subscriber. Each STA may transmit or receive on each of the time blocks 512, 522, or may have a designated function (transmit/receive) for a particular one or more of the time blocks 512, 522.

In some circumstances, it may be desirable for the time block or channel schedule of the STAs to be updated or adjusted. For example, one of the STAs may desire to cancel one or more the time blocks 512, 522. That is, it may be desirable for the STA to avoid transmission during the entirety of the time block 512, 522. This may be desirable when the STA does not have a data packet or has only a partial data packet transmission (does not have a complete data packet transmission) at the point in time when the time block 512, 522 at which the STA is to transmit occurs. It may be desirable for the STA to inform another STA to cancel the entire time block 512, 522 or remainder of the current time block 512, 522. In other circumstances, it may be desirable to cancel the time block 512, 522 when the subscriber is unable to receive a data packet from the publisher due to issues related to the channel switching between the time blocks 512, 522. It may further be desirable to cancel the time block 512, 522 when one of the STAs desires to enter a power save mode. In this case, the STA entering power save mode may inform the other STA of entry of the STA into the power save mode.

Cancellation, however, may not be the only reason to modify the time block schedule. For example, the STA may want to complete a transmission having a high priority by extending the time block 512, 522. This extension, like the cancellation, may be a one-time only or may occur over multiple consecutive (or non-consecutive) time blocks 512, 522. In this case, the publisher may wish to inform the subscriber to remain on the channel rather than switching to the other channel and transmitting. Similarly, the STA may desire a channel change, either for reception or transmission, in one or more of the future time blocks. This channel schedule change may be in addition to, or instead of, a change in the time block schedule.

Although the above is discussed in terms of unicast communication, similar functionality may apply to multicast scenarios. In some embodiments, a multicast source may want to update a transmission schedule for a group service being supplied. This may occur, for example, due to network congestion or a change in the number of sinks, or may be predicted dependent on historic conditions.

The IEEE 802.11 standard at present is limited in the ability to communicate scheduling changes. For example, the 802.11 standard currently permits a STA to send an action frame to enter a power save mode. However, the STA may be unable to exit the power save mode prior to further conditions occurring, e.g., until another frame is sent by the STA to alert other STAs that the STA desires to transition back from the power save mode. Thus, the STA may transmit two frames to effect early termination of the power save mode, one to indicate entry into the power save mode and another to indicate early exit from the power save mode. The STA may also send a Clear-To-Send (CTS)-To-Self frame and subsequently exit the power save mode. Typically, a CTS frame may be transmitted after a Request-To-Send (RTS) is received by a STA. The CTS may be transmitted after a Short Interframe Space (SIFS) if the medium is idle to indicate that transmission of a data frame is possible. After receiving the CTS, the STA that has transmitted the RTS may transmit a data frame. The CTS-To-Self frame is a CTS frame that a STA addresses to itself, and is typically used as a collision protection mechanism as other STAs may allow a time slot to be used by the STA. Use of a CTS-to-Self frame, however, may make the other STA remain awake for the remaining duration of the time block as the other STA may not know that the STA has entered power save mode, unlike the schedule update frame described below which may permit the other STA to leave immediately. A CTS-To-Self frame may also be used in other circumstances, such as when a STA wishes to distribute network allocation vector (NAV) information, the STA may transmit a CTS-To-Self frame with the receiver address equal to its own MAC address and with a duration time that protects a pending transmission.

An end of service period (EOSP) bit defined in Quality of Service (QoS) control may be used to cancel a service period, which is a period of contention-free channel allocation. However, the context in NAN2 is entirely different so that such a bit is unable to be used in NAN2 configurations as there is no definition of a service period in NAN2. Further, in the context of 802.11 systems, the length of a service period may be tied to the number of packets, as indicated in the IEEE 802.11 specification table for settings of the maximum service period length subfield. Thus, the EOSP may require alteration of the information in the subfield; however, altering the definition of the EOSP bit for NAN2 purposes may confuse the STAs (hereinafter also referred to as NAN2 devices) due to a mismatch in information between expected information provided by the subfield and that provided by the bit.

To avoid these issues such as a negotiation between the STAs (resulting in delays), a new action frame, referred to herein as a schedule update frame may be defined in NAN2. The schedule update frame may be used to alter the scheduling of the time blocks and provide a schedule update, such as early termination of a power save mode. FIG. 6 illustrates a schedule update frame in accordance with some embodiments. The schedule update frame 600 may be a NAN public action frame. The schedule update frame 600 may contain several fields, including both legacy fields and at least one non-legacy update field 602. The legacy fields may include a field indicating the category of the frame as a public action frame, an action field and Organizationally Unique Identifier (OUI) specific fields indicating the type and version of the NAN device and action frame. The schedule update field 602 may be a single octet in length, in which the first two bits may be used to indicate the type of scheduling update and the remaining 6 bits may indicate a reason for the update. In other embodiments, only 1 or 2 bits may be used to indicate the type of scheduling update. If 1 bit is used, cancel or extend the current time block may be the only options available. In some embodiments, bits remaining after the type of scheduling update is indicated may be used to convey information entirely unrelated to the schedule. The schedule update field 602 may reload a dialog token field (which is used to match a request with response) in a public action frame to identify the transaction, i.e., an update. The Dialog Token field may be set to a non-zero value chosen by the STA transmitting the request to identify the transaction but may be set to zero to indicate that the schedule update frame is not part of a time synchronization transaction.

In some embodiments, the scheduling update type may include multiple types including early termination, extension or a general scheduling update. For example, the schedule update frame 600 may be used to terminate the remaining duration of a time block using the bit combination "00." In some embodiments, the termination may be limited to only a single time block. In some embodiments, the time block may be the current time block. In particular, a NAN2 device that receives the schedule update frame 600 may be able to terminate the remaining portion of the time block, unlike the use of a CTS-to-Self frame. The schedule update frame 600 may thus, for coexistence with legacy STAs, provide an unaligned schedule attribute (as defined in the IEEE 802.11 specification) that can be used to indicate that the NAN2 device is not available for the remainder of the time block.

In some embodiments, the schedule update frame 600 may also be used for purposes other than merely termination-related, such as a general multicast schedule update. The schedule update frame 600 may also provide a multicast schedule attribute as defined in the IEEE 802.11 specification that can be used to indicate that a multicast schedule is updated. The use of the schedule update frame 600 may thus avoid overloading the context of other action frames, which have other meanings and uses. Defining a schedule update frame may thus enable a specific frame to be used to provide a schedule update and does not require piggybacking of a schedule update information on top of an existing frame transaction, which may not be available at the time when the schedule update is desired (such as early termination).

In some embodiments, the schedule update frame 600 may also be used to indicate a channel change. To this end, the value "11" in the schedule update field 602 may be used to indicate a channel switch.

The schedule update control field 602 may also be used to indicate the reason for the scheduling update. As shown, multiple reasons may be accommodated, including that the NAN2 device is channel switching, there is no traffic to be transmitted (extend), the NAN2 device is entering Power Save mode or excessive congestion exists (early termination) or the change is for an unspecified reason. As shown, the remaining 6 bits may indicate up to 32 other reasons. In other embodiments, the number of bits used to provide the code that indicates the reason may be limited to fewer than 6 bits, for example, to 2 or 3 bits, allowing the remaining bits to be used for other scheduling update purposes. The bits indicating the scheduling update action and the reason may be disposed in any order, for example the reason code may be present before or after the scheduling action update.

In some embodiments, the early termination or extension may be a one-time update that is limited to a single time block, while the schedule update may be a general update that extends across multiple time blocks. In other embodiments, the early termination or extension may be extended to multiple time blocks, which set by a number of time blocks after the current time block or by duration from the current time block as indicated in one or more bits of the schedule update control field 602. In some embodiments, the action (e.g., termination or extension), whether for a single time block or multiple time blocks, may be delayed. In this case, the initiation may be the next time block or a number of time blocks indicated in one or more bits of the schedule update control field 602. If extension of the current time block is indicated in the schedule update control field 602, the duration of the extension may be indicated in an attribute following the schedule update control field 602. The duration may be, for example, provided in an attribute immediately following the schedule update control field. In some embodiments, if the first bits indicate that the extension is desired, one of the later bits in the schedule update control field may indicate the length of the extension (in any desired unit—e.g., bits or octets) or which of the following fields is to be used to indicate the extension length. The extension length may in addition to or instead of the update reason code. Similarly, the general schedule update (time block and/or channel) may be indicated in the schedule update control field 602 or in a later attribute separate from the schedule update control field 602.

In the schedule update frame, the unaligned schedule attribute defined in the current IEEE 802.11 specification can be used to indicate that the NAN2 device is not available for the rest of the time block. In addition, in the schedule update frame, the multicast schedule attribute defined in the current IEEE 802.11 specification can be used to indicate that a multicast schedule is updated. As shown, the schedule update frame 600 may be extended to contain additional attributes in one or more other fields after the schedule update control field 602.

One of the fields in FIG. 6 is the OUI subtype, which may be specified as a number of different ways. FIG. 7 illustrates an action frame subtype in accordance with some embodiments. The OUI subtype of the action frame subtype 700 may occupy an octet, of which only 1-4 bits or fewer than 16 values (shown as 9 in FIG. 7) may be used. The remaining values and/or bits may be reserved for other OUI subtypes or other information unrelated to the subtype. A specific value, shown as value "9" in the action subtype frame 700 of FIG. 7, which may have been previously been reserved (unused), may be used to indicate that the action frame is a NAN schedule update frame. In other embodiments, the value that indicates a NAN Schedule Update may take any other available value (e.g., 10-255 of the octet defining the OUI Subtype).

FIG. 8 illustrates additional public action frame attributes in accordance with some embodiments. An example of possible attributes that can be provided in the public action frame 800 is shown in FIG. 8. The public action frame attributes 800 may be transmitted by the STA in the public action frame shown in FIG. 6. The public action frame attributes 800 may include one or more attributes that specify, among others, the QoS desired for the NDL link between the STA and another STA, the multicast schedule of a multicast service provided by the STA, the NAN availability, the unaligned schedule of the STA that indicates which time blocks may be free and the further availability map that indicates further availability of the STA. In addition, the public action frame attributes 800 may also include a schedule update control attribute. The schedule update control attribute may replace the schedule update control field in the schedule update frame shown in FIG. 6 such that only one of the two carries the schedule update control. Other attributes may also be added. The public action frame attributes 800 may also be modified as above to indicate channel changes as well as or instead of time block changes.

The schedule update attribute shown in FIG. 8 may be defined in a manner similar to the schedule update control field of FIG. 6. FIG. 9 illustrates a schedule update control attribute in accordance with some embodiments. Similar to other types of IEEE 802.11 attributes, the first three octets may be used to identify the type of NAN attribute (here schedule update control) in the attribute ID field and the length of the following schedule update control field in the length field. The schedule update control attribute 900 may be a single octet in length. The first one or two bits may be used to indicate the type of scheduling update and the remaining bits may indicate a reason for the update. In other embodiments, the reason may be omitted from the schedule update control attribute. Unlike the schedule control update field, which may be able to refer to another attribute to indicate the current time block length, the schedule control update attribute may indicate the length of the current time block, which may serve to indicate an extension. In this case, the extension may be for a predetermined amount of time (e.g., a predetermined number of symbols). Similarly, the schedule update control attribute 900 may also be modified as above to indicate channel changes as well as or instead of time block changes.

Figure 10:
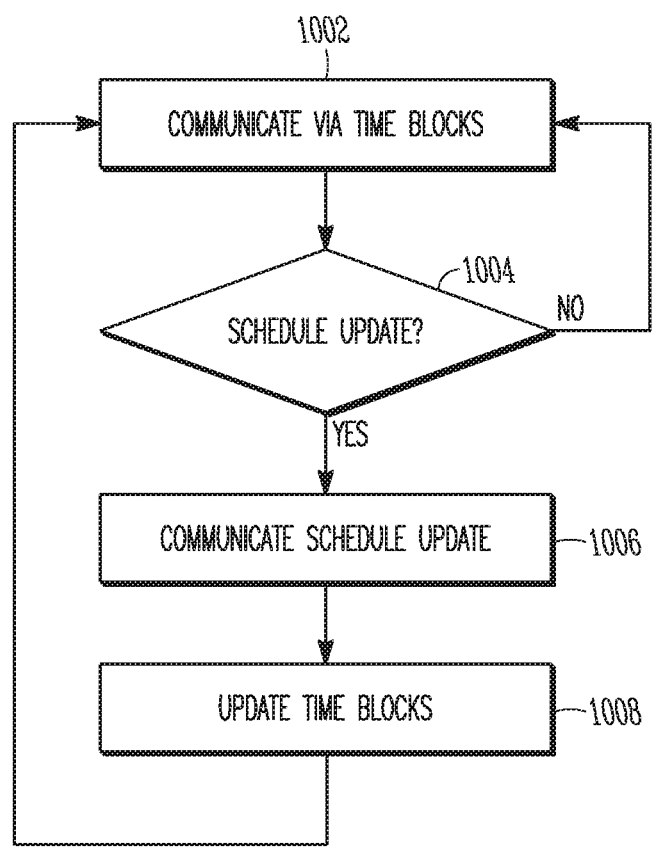
FIG. 10 illustrates a method of updating a communication schedule in accordance with some embodiments.

FIG. 10 illustrates a method of updating a communication schedule in accordance with some embodiments. The method may be performed by any of the STAs or NAN devices shown in FIGS. 1-4 and use the frames or attributes shown in FIGS. 5-9. At operation 1002 two or more STAs communicate via different time blocks. Each time block may use a different channel from one or more of the other time blocks. In some circumstances, each adjacent time block may use a different frequency. The STA that transmits data may change with each time block.

At operation 1004, the STA may determine whether the schedule is to be updated. The update may affect a single time block (one-time only) or may be a continuous, affecting all transmissions by the STA including or after the current time block. In some embodiments, the update may involve cancellation or extension of the current time block. In some embodiments, a general schedule update may, for example, change the length or periodicity of the time blocks and/or channel, for example as the time blocks/channel affect a particular service and/or other STA.

If no schedule update is determined to be used, the STA returns to operation 1002, where the STA continues to communicate with the one or more other STA at the appropriate time blocks. On the other hand, in response to determining that a schedule update is to occur at operation 1006, the STA may transmit a NAN2 public action frame to the other STA, where the public action frame may be received and acted upon. The public action frame indicate a schedule update frame in the OUI subtype field. The OUI subtype field may indicate that the frame is a schedule update frame containing a schedule update. The schedule update frame may also contain a new field—the schedule update control field—or the same information may be contained in a new attribute—the schedule update attribute. The information may indicate only the type of scheduling action, or may also indicate the reason to permit the other STA to react accordingly. For example, the other STA may continue to process previous packets transmitted to and/or received from the STA without providing any user indication if the cause for packet cancellation is channel switching or congestion, whereas if the issue is entry into power save mode, the STA may buffer packets for the STA for an extended period and/or provide a specific user indication on a user interface of the other STA.

At operation 1008, the STA and the other STA may update the schedule according to the indication provided in the public action frame. This is to say that the current time block may be immediately terminated or extended beyond its normal range, or a general unicast or multicast schedule update may be used. In some embodiments, various attributes in the frame may be used to provide information, for example: the unaligned schedule attribute may be used to indicate that the STA is not available for the rest of the time block, NAN availability attribute may be used to indicate that the time block is extended, and the multicast schedule attribute may be used to indicate that the multicast schedule is updated.

Examples

Example 1 is an apparatus of a Neighborhood Awareness Network (NAN) device, the apparatus comprising: a memory; and processing circuitry in communication with the memory and arranged to: generate, for transmission to another NAN device, a Neighborhood Area Network (NAN) public action frame comprising an indication that the NAN public action frame is a schedule update frame and a change in a schedule of at least one of time blocks or one or more channels for communication between the NAN device and the other NAN device, wherein the change is selectable from a plurality of different changes to the time blocks including changes to a current time block and at least one of future time blocks or one or more channels; and adjust the schedule as indicated by the schedule update frame to change communication with the other NAN device.

In Example 2, the subject matter of Example 1 optionally includes, wherein the schedule update frame comprises an Organizationally Unique Identifier (OUI) subtype, the indication that the NAN public action frame is the schedule update frame provided by a value of the OUI subtype.

In Example 3, the subject matter of any one or more of Examples 1-2 optionally include, wherein the schedule update frame comprises a schedule update control field that provides the indication for the change in the schedule.

In Example 4, the subject matter of Example 3 optionally includes, wherein the indication for the change of the schedule in the schedule update control field is selectable from among at least cancellation of the current time block, extension of the current time block, or a general schedule update that adjusts the at least one of future time blocks or one or more channels, which are indicated by different values in the schedule update control field.

In Example 5, the subject matter of Example 4 optionally includes, wherein the schedule update frame further comprises a NAN availability attribute that indicates a length of extension of the current time block.

In Example 6, the subject matter of any one or more of Examples 3-5 optionally include, wherein the schedule update control field is limited to indicate a change of the current time block.

In Example 7, the subject matter of any one or more of Examples 3-6 optionally include, wherein the schedule update control field is further arranged to indicate a reason for update of the schedule.

In Example 8, the subject matter of Example 7 optionally includes, wherein the reason for the update of the schedule is selectable from among at least a selection from among at least: Unspecified, Channel Switching, Power Save, No Traffic, or Congestion, which are indicated by different values in the schedule update control field.

In Example 9, the subject matter of any one or more of Examples 7-8 optionally include, wherein: the change in the schedule is provided in at least one of a first two bits of the schedule update control field, and the reason for the update of the schedule is disposed in the schedule update control field after the change in the schedule.

In Example 10, the subject matter of any one or more of Examples 1-9 optionally include, wherein the indication for the change of the schedule is selectable from among at least cancellation of the current time block, extension of the current time block, or a general schedule update that adjusts the one or more future time blocks, which are indicated by different values in a NAN availability attribute in the schedule update frame, the NAN availability attribute following a schedule update control field.

In Example 11, the subject matter of any one or more of Examples 1-10 optionally include, wherein the schedule update frame comprises an unaligned schedule attribute that indicates the NAN device is unavailable for a remainder of a current time block.

In Example 12, the subject matter of any one or more of Examples 1-11 optionally include, wherein the schedule update frame comprises a NAN availability attribute that indicates a general schedule update that adjusts the at least one of future time blocks or one or more channels.

In Example 13, the subject matter of any one or more of Examples 1-12 optionally include, wherein: the processing circuitry comprises baseband circuitry arranged to generate a multicast service, and the schedule update frame comprises a multicast schedule attribute that indicates a multicast schedule update for the multicast service.

In Example 14, the subject matter of any one or more of Examples 1-13 optionally include, further comprising: an antenna configured to provide communications between the NAN device and the other NAN device.

Example 15 is a method of adjusting communications between Neighborhood Awareness Network (NAN) devices, the method comprising: communicating data between a first NAN device and a second NAN device on a schedule of repeating time blocks in one or more channels, each of the first and second NAN devices one of transmitting or receiving on a first set of the time blocks on a first channel and on a second set of the time blocks on a second channel; determining at the first NAN device that a change in the schedule of time blocks is desired; transmitting the change from the first NAN device to the second NAN device in a NAN public action frame; and adjusting communication between the first and second NAN device based on the change after the NAN public action frame has been transmitted.

In Example 16, the subject matter of Example 15 optionally includes, wherein: the NAN public action frame comprises an Organizationally Unique Identifier (OUI) subtype having a value that indicates the NAN public action frame is a schedule update frame.

In Example 17, the subject matter of any one or more of Examples 15-16 optionally include, wherein: the NAN public action frame is a schedule update frame comprising a schedule update control field that provides the indication for the change in the schedule, and the method further comprises: determining the change of the schedule from among different changes, the change selectable from among different changes comprising at least: cancellation of a current time block, extension of the current time block, or a general schedule update that updates one or more future time blocks such that adjustment of the communication between the first and second NAN device comprises one of cancelling or extending the current time block or adjusting future communications between the first and second NAN device as indicated by the general schedule update; and inserting a value in the schedule update control field to indicate the change of the schedule, where different values indicate the different changes.

In Example 18, the subject matter of Example 17 optionally includes, wherein: the NAN public action frame is a schedule update frame comprising a schedule update control field that provides the indication for the change in the schedule, and the schedule update control field further provides a reason for update of the schedule.

In Example 19, the subject matter of Example 18 optionally includes, further comprising: determining the reason for the update of the schedule, the reason selectable from among different reasons comprising at least: Unspecified, Channel Switching, Power Save, No Traffic, or Congestion; and inserting a value in the schedule update control field to indicate the reason, where different values indicate the different reasons.

In Example 20, the subject matter of any one or more of Examples 18-19 optionally include, wherein: the change in the schedule is provided in at least one of a first two bits of the schedule update control field, and the reason for the update of the schedule is disposed in the schedule update control field after the change in the schedule.

In Example 21, the subject matter of any one or more of Examples 15-20 optionally include, wherein: the NAN public action frame is a schedule update frame comprises at least one of: a first NAN availability attribute that indicates a length of extension of a current time block, a second NAN availability attribute that indicates a change of schedule, or a third NAN availability attribute that indicates a general schedule update that adjusts at least one of future time blocks or one or more channels, or an unaligned schedule attribute that indicates the first NAN device is unavailable for a remainder of a current time block.

In Example 22, the subject matter of Example 21 optionally includes, wherein the NAN public action frame comprises a schedule update control field that provides the indication for the change in the schedule and the at least one of the first, second or third NAN availability or unaligned schedule attribute is one of contained in or follows a schedule update control field.

In Example 23, the subject matter of any one or more of Examples 15-22 optionally include, wherein: the data comprises data of a multicast service, and the schedule update frame comprises a multicast schedule attribute that indicates a multicast schedule update for the multicast service.

Example 24 is a non-transitory computer-readable storage medium that stores instructions for execution by one or more processors of a Neighborhood Area Network (NAN) device to configure the NAN device to: communicate data to another NAN device on a schedule of repeating time blocks such that the NAN device and the other NAN device communicate in different time blocks on different channels; and transmit a NAN public action frame that indicates one of cancellation of a current time block, extension of the current time block, or a general schedule update that updates one or more future time blocks such that the current time block is cancelled or extended or future communications between the NAN devices is changed as indicated by the general schedule update.

In Example 25, the subject matter of Example 24 optionally includes, wherein the NAN public action frame comprises a schedule update control field that indicates a reason for update of the schedule, the reason for the update of the schedule comprises a selection from among at least Unspecified, Channel Switching, Power Save, No traffic, or Congestion.

In Example 26, the subject matter of any one or more of Examples 24-25 optionally include, wherein the NAN public action frame comprises at least one of: an unaligned schedule attribute that indicates the first NAN device is unavailable for a remainder of a current time block, a NAN availability attribute that indicates a length of extension of the current time block, or a NAN availability attribute that indicates a general schedule update that adjusts the at least one of future time blocks or one or more channels.

In Example 27, the subject matter of any one or more of Examples 24-26 optionally include, wherein the NAN public action frame comprises an Organizationally Unique Identifier (OUI) subtype having a value that indicates the NAN public action frame is a schedule update frame.

Example 28 is an apparatus of a Neighborhood Awareness Network (NAN) device, the apparatus comprising: means for communicating data to another NAN device on a schedule of repeating time blocks such that the NAN device and the other NAN device communicate in different time blocks on different channels; and means for transmitting a NAN public action frame that indicates one of cancellation of a current time block, extension of the current time block, or a general schedule update that updates one or more future time blocks such that the current time block is cancelled or extended or future communications between the NAN devices is changed as indicated by the general schedule update.

In Example 29, the subject matter of Example 28 optionally includes, wherein the NAN public action frame comprises a schedule update control field that indicates a reason for update of the schedule, the reason for the update of the schedule comprises a selection from among at least Unspecified, Channel Switching, Power Save, No traffic, or Congestion.

In Example 30, the subject matter of any one or more of Examples 28-29 optionally include, wherein the NAN public action frame comprises at least one of: an unaligned schedule attribute that indicates the first NAN device is unavailable for a remainder of a current time block, a NAN availability attribute that indicates a length of extension of the current time block, or a NAN availability attribute that indicates a general schedule update that adjusts the at least one of future time blocks or one or more channels.

In Example 31, the subject matter of any one or more of Examples 28-30 optionally include, wherein the NAN public action frame comprises an Organizationally Unique Identifier (OUI) subtype having a value that indicates the NAN public action frame is a schedule update frame.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The invention claimed is:

1. An apparatus of a Neighborhood Awareness Network (NAN) device, the apparatus comprising:
a memory; and
processing circuitry in communication with the memory and arranged to:
generate, for transmission to another NAN device, a Neighborhood Area Network (NAN) public action frame comprising an indication that the NAN public action frame is a schedule update frame and a change in a schedule of at least one of time blocks or one or more channels for communication between the NAN device and the other NAN device, wherein the change is selectable from a plurality of different changes to the time blocks including changes to a current time block and at least one of future time blocks or one or more channels; and
adjust the schedule as indicated by the schedule update frame to change communication with the other NAN device,
wherein the schedule update frame comprises an Organizationally Unique Identifier (OUI) subtype, the indication that the NAN public action frame is the schedule update frame provided by a value of the OUI subtype.

2. The apparatus of claim 1, wherein the schedule update frame comprises a schedule update control field that provides the indication for the change in the schedule.

3. The apparatus of claim 2, wherein the indication for the change of the schedule in the schedule update control field is selectable from among at least cancellation of the current time block, extension of the current time block, or a general schedule update that adjusts the at least one of future time blocks or one or more channels, which are indicated by different values in the schedule update control field.

4. The apparatus of claim 3, wherein the schedule update frame further comprises a NAN availability attribute that indicates a length of extension of the current time block.

5. The apparatus of claim 2, wherein the schedule update control field is limited to indicate a change of the current time block.

6. The apparatus of claim 2, wherein the schedule update control field is further arranged to indicate a reason for update of the schedule.

7. The apparatus of claim 6, wherein the reason for the update of the schedule is selectable from among at least a selection from among at least: Unspecified, Channel Switching, Power Save, No Traffic, or Congestion, which are indicated by different values in the schedule update control field.

8. The apparatus of claim 6, wherein:
the change in the schedule is provided in at least one of a first two bits of the schedule update control field, and
the reason for the update of the schedule is disposed in the schedule update control field after the change in the schedule.

9. The apparatus of claim 1, wherein the indication for the change of the schedule is selectable from among at least cancellation of the current time block, extension of the current time block, or a general schedule update that adjusts the one or more future time blocks, which are indicated by different values in a NAN availability attribute in the schedule update frame, the NAN availability attribute following a schedule update control field.

10. An apparatus of a Neighborhood Awareness Network (NAN) device, the apparatus comprising:
a memory; and
processing circuitry in communication with the memory and arranged to:
generate, for transmission to another NAN device, a Neighborhood Area Network (NAN) public action frame comprising an indication that the NAN public action frame is a schedule update frame and a change in a schedule of at least one of time blocks or one or more channels for communication between the NAN device and the other NAN device, wherein the change is selectable from a plurality of different changes to the time blocks including changes to a current time block and at least one of future time blocks or one or more channels; and
adjust the schedule as indicated by the schedule update frame to change communication with the other NAN device,
wherein the schedule update frame comprises an unaligned schedule attribute that indicates the SAN device is unavailable for a remainder of a current time block.

11. The apparatus of claim 1, wherein the schedule update frame comprises a NAN availability attribute that indicates a general schedule update that adjusts the at least one of future time blocks or one or more channels.

12. The apparatus of claim 1, wherein:
the processing circuitry comprises baseband circuitry arranged to generate a multicast service, and
the schedule update frame comprises a multicast schedule attribute that indicates a multicast schedule update for the multicast service.

13. The apparatus of claim 1, further comprising:
an antenna configured to provide communications between the NAN device and the other NAN device.

14. A method of adjusting communications between Neighborhood Awareness Network (NAN) devices, the method comprising:
communicating data between a first NAN device and a second NAN device on a schedule of repeating time blocks in one or more channels, each of the first and second NAN devices one of transmitting or receiving on a first set of the time blocks on a first channel and on a second set of the time blocks on a second channel;
determining at the first NAN device that a change in the schedule of time blocks is desired;
transmitting the change from the first NAN device to the second NAN device in a NAN public action frame; and
adjusting communication between the first and second NAN device based on the change after the NAN public action frame has been transmitted,
wherein the NAN public action frame comprises an Organizationally Unique Identifier (OUI) subtype having a value that indicates the NAN public action frame is a schedule update frame.

15. The method of claim 14, wherein:
the NAN public action frame is a schedule update frame comprising a schedule update control field that provides the indication for the change in the schedule, and
the method further comprises:
determining the change of the schedule from among different changes, the change selectable from among different changes comprising at least: cancellation of a current time block, extension of the current time block, or a general schedule update that updates one or more future time blocks such that adjustment of the communication between the first and second NAN device comprises one of cancelling or extending the current time block or adjusting future communications between the first and second NAN device as indicated by the general schedule update; and inserting a value in the schedule update control field to indicate the change of the schedule, where different values indicate the different changes.

16. The method of claim 15, wherein:
the NAN public action frame is a schedule update frame comprising a schedule update control field that provides the indication for the change in the schedule, and
the schedule update control field further provides a reason for update of the schedule.

17. The method of claim 16, further comprising:
determining the reason for the update of the schedule, the reason selectable from among different reasons comprising at least: Unspecified, Channel Switching, Power Save, No Traffic, or Congestion; and
inserting a value in the schedule update control field to indicate the reason, where different values indicate the different reasons.

18. The method of claim 16, wherein:
the change in the schedule is provided in at least one of a first two bits of the schedule update control field, and
the reason for the update of the schedule is disposed in the schedule update control field after the change in the schedule.

19. The method of claim 14, wherein:
the NAN public action frame is a schedule update frame comprises at least one of:
 a first NAN availability attribute that indicates a length of extension of a current time block,
 a second NAN availability attribute that indicates a change of schedule, or
 a third NAN availability attribute that indicates a general schedule update that adjusts at least one of future time blocks or one or more channels, or
 an unaligned schedule attribute that indicates the first NAN device is unavailable for a remainder of a current time block.

20. The method of claim 19, wherein the NAN public action frame comprises a schedule update control field that provides the indication for the change in the schedule and the at least one of the first, second or third NAN availability or unaligned schedule attribute is one of contained in or follows a schedule update control field.

21. The method of claim 14, wherein:
the data comprises data of a multicast service, and the schedule update frame comprises a multicast schedule attribute that indicates a multicast schedule update for the multicast service.

22. A non-transitory computer-readable storage medium that stores instructions for execution by one or more processors of a Neighborhood Area Network (NAN) device to configure the NAN device to:
communicate data to another NAN device on a schedule of repeating time blocks such that the NAN device and the other NAN device communicate in different time blocks on different channels; and
transmit a NAN public action frame that indicates one of cancellation of a current time block, extension of the current time block, or a general schedule update that updates one or more future time blocks such that the current time block is cancelled or extended or future communications between the NAN devices is changed as indicated by the general schedule update,
wherein the NAN public action frame comprises an Organizationally Unique Identifier (OUI) subtype having a value that indicates the NAN public action frame is a schedule update frame.

23. A non-transitory computer-readable storage medium that stores instructions for execution by one or more processors of a Neighborhood Area Network (NAN) device to configure the NAN device to:
communicate data to another NAN device on a schedule of repeating time blocks such that the NAN device and the other NAN device communicate in different time blocks on different channels; and
transmit a NAN public action frame that indicates one of cancellation of a current time block, extension of the current time block, or a general schedule update that updates one or more future time blocks such that the current time block is cancelled or extended or future communications between the NAN devices is changed as indicated by the general schedule update,
wherein the NAN public action frame comprises a schedule update control field that indicates a reason for update of the schedule, the reason for the update of the schedule comprises a selection from among at least Unspecified, Channel Switching, Power Save, No traffic, or Congestion.

24. The medium of claim 22, wherein the NAN public action frame comprises at least one of:
 an unaligned schedule attribute that indicates the first NAN device is unavailable for a remainder of a current time block,
 a NAN availability attribute that indicates a length of extension of the current time block, or
 a NAN availability attribute that indicates a general schedule update that adjusts the at least one of future time blocks or one or more channels.

* * * * *

UNITED STATES PATENT AND TRADEMARK OFFICE
CERTIFICATE OF CORRECTION

PATENT NO. : 10,098,135 B2
APPLICATION NO. : 15/194257
DATED : October 9, 2018
INVENTOR(S) : Huang et al.

It is certified that error appears in the above-identified patent and that said Letters Patent is hereby corrected as shown below:

In the Claims

In Column 24, Line 25, in Claim 10, delete "SAN" and insert --NAN-- therefor

Signed and Sealed this
Twenty-first Day of April, 2020

Andrei Iancu
*Director of the United States Patent and Trademark Office*